2,807,594

ANION EXCHANGE RESINS FROM PHENOLIC ETHERS

Karl Haagen, Leverkusen-Bayerwerk, Germany, assignor to Farbenfabriken Bayer Aktiengesellschaft, Leverkusen, Germany, a corporation of Germany No Drawing. Application June 2, 1953, Serial No. 359,211

Claims priority, application Germany June 6, 1952

8 Claims. (Cl. 260—2.1)

This invention relates to solid infusible resins containing aromatic ether groups and basic nitrogen groups which are insoluble in aqueous solutions and in dilute acids. This invention furthermore concerns a method of producing these resins and a process for removing anions from liquid media by means of said resins.

In accordance with the invention resins with valuable properties are obtained by condensing aldehydes, preferably formaldehyde, and ethers of aromatic hydroxy compounds containing at least one basic nitrogen atom, preferably in the form of a quaternary ammonium group, or such atomic groups by way of which basic nitrogen atoms may be introduced into the ether molecule in an acid medium and, if necessary, subjecting the resultant condensation products to an aftertreatment with compounds by which basic nitrogen atoms are introduced into the resin molecule. Atomic groups by way of which basic nitrogen atoms may be introduced into the resin are for instance the halogen methyl group attached to an aromatic nucleus or the halogen methyl or dihalogen methylene group attached to an aliphatic group, whose halogen atom is activated for instance by a free or etherified hydroxyl group or by a keto group at the carbon atom adjacent to that to which the halogen atom is bound.

Suitable starting materials for producing the new anion exchangers are for instance alkyl aryl ethers containing a reactive halogen atom attached to the aliphatic group of the ether, such for example as phenoxyethyl bromide, $C_6H_5OCH_2CH_2Br$, or the reaction products of epichlorohydrin and mono- and dihydroxy benzenes; furthermore, alkylaryl ethers, diaryl ethers and cyclic ethers, containing a halogen methyl group in the aromatic nucleus, furthermore aromatic and cyclic ethers containing aliphatic groups with activated halogen atoms, suitable ethers being anisol, phenetol, diphenyl ether, diphenylene dioxide and diphenylene oxide.

Basic groups may be introduced in the above said ethers for instance by means of ammonia, preferably by primary and secondary as well as tertiary aliphatic amines, as for instance methylamine, dimethylamine, trimethylamine, ethylamine, diethylamine, triethylamine, propylamine and aliphatic polyamines, which may contain tertiary nitrogen atoms as for instance ethylenediamine, polyethylenediamine as they are obtained by reacting ethylenedichloride with ammonia, hexamethylenediamine, diethylenetriamine, triethylenetetramine, tetraethylenepentamine, or heterocyclic bases containing at least 1 nitrogen atom and hydrogenation products of these heterocyclic bases as for instance pyridine, piperidine, pyrazine, whose nitrogen atoms may be alkylated. Exchangers containing quaternary ammonium groups are of special value because they offer the possibility to separate weakly acid compounds such as carbon dioxide, hydrogen sulfide and silicic acid from aqueous solutions, and to exchange anions against hydroxyl ions even from neutral and alkaline solutions. These exchangers are obtained by reacting the above said compounds with tertiary bases. Preferably, tertiary bases of low molecular weight are used; it should be understood, however, that also other tertiary bases come within the scope of the invention.

The condensation with formaldehyde or its polymers to form resinous materials may be carried out with quaternary ammonium salts of aromatic ethers. Within this process, it may be advantageous to complementarily employ, as "cross-linking agent," a second resin forming component containing no active group for ion exchange, which, however, is preferably polyfunctional as regards its reactivity with formaldehyde, that is to say which contains at least two carbon atoms capable of reacting with formaldehyde. Suitable compounds of this type are for instance alkyl aryl ethers such as phenyl methyl ether, pyrocatechol diethyl ether, naphthyl methyl ether or cyclic ethers for instance diphenyl oxide, diphenylene oxide, diphenylene dioxide, as well as hydrocarbons such as xylene, naphthalene or mixtures thereof, for instance the fraction of the coal tar distillation of the boiling point 205–400° C., which is marketed under the name of "anthracene oil." Suitable cross-linking agents are also the chloromethylation products of the said compounds. In the latter case, the reactive halogen, which is present in the resin after condensation, can be reacted with organic bases with the introduction of further active groups for anion exchange.

It is within the scope of the invention to carry out the condensation of formaldehyde with nitrogen-free aromatic ethers containing reactive halogen atoms. In this case, the comminuted resin is heated with at least one of the afore mentioned organic bases to accomplish the introduction of the basic active groups and the conversion to the anion exchanger.

The resins are preferably obtained by reacting 1 molecular equivalent of the afore mentioned ethers with at least 1–2 molecular equivalents of an aldehyde preferably formaldehyde in the presence of an ionizing agent as for instance in an acid aqueous medium at elevated temperature preferably at about 60–110° C., continuing this reaction until a gel forms and heating said gel at elevated temperature preferably between about 70 and 120° C., so that the resins become insoluble in dilute strong acids.

The new anion exchangers obtained by the invention are distinguished over the previously known anion exchange materials by an increased capacity of combining with silicic acid and by an improved stability.

The invention is further illustrated by the following examples without being restricted thereto.

*Example 1*

180 cc. of an aqueous trimethylamine solution of 37 percent by volume are introduced in drops at 30–40° C. with stirring into a solution of 94 grams of phenol in 94 grams of epichlorohydrin within about 2 hours. The temperature of the mixture is raised gradually to 100° C. within further 2 hours. 60 grams of para-formaldehyde are then added and, after stirring for about 30 minutes, 60 cc. of sulfuric acid of 70 percent by weight. The temperature raises from 65° C. to 98° C. and a weakly yellowish colored, clear viscous solution is obtained, which solidifies to a clear gel on heating over night at about 90° C. The gel which can be cut with the knife, is dried at 110° C. After swelling the comminuted exchanger in water and converting it into the free base with sodium hydroxide solution, 100 cc. of the exchange material absorb 76 millival of HCl from a dilute aqueous hydrochloric acid solution (1 millival=1 cc. of n/1 HCl).

The production of an anion exchanger from the above starting materials is not limited to the above described process but may be varied within wide limits. As an alternative, for instance phenol and epichlorohydrin are condensed under the catalytic influence of small quantities of anhydrous trimethyl amine and the condensation product is subsequently reacted with trimethylamine to form the quaternary base or, first, phenoxypropylene oxide is produced and reacted with a tertiary amine to form the quaternary base, or finally epichlorohydrin is reacted with trimethyl amine for instance by introducing the anhydrous tertiary base into a solution of epichlorohydrin in an organic solvent such as gasoline, xylene, diphenyl ether, and condensing the resultant reaction product, which precipitates in white crystals, with phenol. At last, other aromatic mono- or polyhydroxy compounds, such as resorcinol and pyrocatechol, may be employed instead of phenol.

*Example 2*

280 grams of crystallized phenol are melted by passing over some gaseous trimethyl amine and then mixed with 280 grams of epichlorohydrin. After heating to about 70° C. the temperature rises to 125° C. without further external heating and is then brought to 150° C. by heating; no boiling occurs. The mixture is then allowed to cool and trimethylamine is introduced while cooling to 35–50° C. To complete the reaction of the condensation product of phenol and epichlorohydrin with the tertiary base, 100 cc. of an aqueous trimethylamine solution are added and the temperature is brought gradually (within 3 hours) to 118° C.; 180 grams of para-formaldehyde and, at about 60° C., 110 cc. of sulfuric acid of 70% by weight are added. The temperature rises slowly to 102° C. and the reaction mixture gives a clear solution in water. 85 grams of diphenyl ether are added in drops within 15 minutes and, thereupon, further 80 grams of para-formaldehyde and 40 cc. of sulfuric acid of 70% strength are added. After about 20–30 minutes the viscous solution is poured into a vessel, which may be closed, and heated to 90–95° C. for about 16 hours. The solution solidifies to a slightly turbid gel which is cut into slices and heated in the atmosphere at 120° C. for 20 hours. The exchange material is comminuted to a particle size of 0.5–1.5 mm., swelled in water, converted into the free base with dilute sodium hydroxide solution and the excess of alkali is removed by washing. By filtering a n/10 sodium chloride solution through 100 cc. of the exchanger 66 millival of NaOH are formed by the exchange of Cl ions against OH ions. This exchanging capacity is increased to 75 millival of NaOH per 100 cc. of exchange material by heating same with excess aqueous trimethylamine solution to 100° C. under pressure.

*Example 3*

0.75 mol of the quaternary ammonium salt obtained by reacting phenoxyethyl bromide, C6H5OCH2CH2Br, with trimethylamine is heated with 40 grams of diphenylether, 60 grams of para-formaldehyde and 35 cc. of sulfuric acid (70% by weight) to the boil with stirring. The reaction mixture reaches 108–109° C. and is maintained at this temperature first without external heating and later with heating, totally for about 1 hour. By heating in the water bath to 90–95° C. over night the viscous solution solidifies to a solid, slightly turbid gel which is heated to 120° C. for another 14 hours. 100 cc. of the comminuted exchanger swelled in water release 58 millival of NaOH from a dilute neutral sodium chloride solution after regenerating with sodium hydroxide solution and washing free from alkali.

Instead of phenoxy ethyl bromide, also equivalent amounts of phenoxy propyl bromide, phenoxy butyl bromide or phenoxy isobutyl bromide may be employed.

*Example 4*

Hydrogen chloride is introduced into an emulsion of 170 grams of diphenyl ether and 35 grams of para-formaldehyde in 170 grams of sulfuric acid of 75% strength with vigorous stirring and cooling so as to prevent the temperature from exceeding 75° C. until HCl is not adsorbed any longer; this takes about one hour. 100 grams of the quaternary ammonium salt obtained by reacting trimethylamine with chloromethyl diphenyl ether, and 120 grams of para-formaldehyde are added to the chloromethylation product and the mixture is heated with stirring. The resulting milky solution boils at about 108° C. The viscosity increases rapidly and solidification to a solid gel occurs on prolonged heating to 90–95° C. The gel is comminuted and heated in the open air at 100° C. for 36 hours. 100 cc. of the swelled resin comminuted to a particle size of 0.5–1.0 mm. exchange 17 millival of Cl ions against hydroxyl ions from dilute sodium chloride solution after treating with sodium hydroxide solution and removing the excess alkali by washing. The exchanging capacity of the resin is increased to 60 millival per 100 cc. by heating the exchange material with trimethylamine solution to about 100° C. under pressure for some hours.

*Example 5*

170 grams of diphenyl ether, 60 grams of para-formaldehyde and 100 cc. of sulfuric acid of 70% strength (70% by weight) are emulsified with the addition of 10 grams of an emulsifier while vigorously stirring and introducing a vigorous stream of hydrogen chloride for two hours. The temperature rises first to 53° C. and drops then slowly. After the absorption of HCl is finished the milky emulsion is reacted with 75 grams of para-formaldehyde and heated to 113° C. within half an hour. A white, salve-like mass is obtained, which is heated first in a closed vessel to 90–95° C. for 16 hours and after that to 100° C. in the atmosphere. The condensation product is comminuted to a particle size of 0.5–1.0 mm. and heated with aqueous trimethyl amine solution to 100° C. in the autoclave.

100 cc. of the exchanger swelled in water exchange 50 millivals of Cl ions against OH ions after regenerating with sodium hydroxide solution and removing the alkali by washing.

*Example 6*

Hydrogen chloride is passed into a mixture of 128 grams of naphthalene, 65 grams of para-formaldehyde and 100 cc. of sulfuric acid of 70% strength. The temperature rises and the naphthalene liquefies. After about 30 minutes 80 grams of (trimethyl)-3-phenoxy-2-hydroxy-propyl-ammonium-chloride

$C_6H_5OCH_2CHOHCH_2N(CH_3)_3Cl$ and, after further 30 minutes, 90 grams of para-formaldehyde are added. The mixture is heated to 105° C. for ½ hour and the introduction of hydrogen chloride is stopped when this temperature is reached. After the resinous mixture has become viscous it is heated to 90° C. for about 16 hours and dried at 100° C. in the open atmosphere. The resultant solid resin is comminuted to a particle size of 0.5–1.5 mm., washed with water and heated to 100° C. under pressure with trimethylamine solution. 100 cc. of the exchange material swelled in water exchange 56 millival of chlorine ions against hydroxyl ions from an aqueous sodium chloride solution after regenerating with sodium hydroxide solution and washing neutral.

*Example 7*

650 grams of phenoxyethyl-trimethyl-ammonium-chloride $C_6H_5OCH_2CH_2-N(CH_3)_3Cl$, which is obtained by reacting phenoxyethylchloride and trimethylamine, are heated with stirring to 60–70° C. together with 255 grams of diphenyl ether, 350 grams of para-formaldehyde and 730 grams of sulfuric acid (70%). The temperature rises to 109° C. without further external heating and the mixture is kept at this temperature for about 15 minutes while refluxing. The condensation product which has become viscous is heated to 90° C. for about 12 hours hours and solidifies to a brownish yellow, slightly turbid gel. The gel is cut into slices which are heated to 110° C. for 24 hours. About 1730 grams of xerogel are thus obtained. The xerogel is ground, swelled in water and washed until the acid has been substantially removed. The wet exchanger is introduced into 10-15% aqueous trimethylamine solution, about 100-120 cc. of trimethylamine solution being applied per 100 grams of the ground xerogel. The mixture is left standing over night and heated gradually the following day to 95-100° C. with stirring whereupon the excess trimethylamine is distilled off. The capacity amounts to 72 millival per 100 mol of the swelled exchanger.

*Example 8*

783 grams of phenoxyethylchloride $C_6H_5OCH_2CH_2Cl$ are introduced within 30 minutes while stirring into 600 grams of a mixture of polyethylene polyamine bases (of the boiling point 150-200° C.) preheated to 100° C. These polyethylene polyamine bases are obtained by condensing ethylene chloride and ammonia. The temperature rises during the condensation to 120-130° C. and is kept at 130° C. for another hour after the addition of the chloride is finished. 250 grams of ethylene chloride are slowly introduced in drops and the mixture is boiled with stirring and refluxing until the temperature of the reaction product reaches 160° C. The ethylene chloride induces the formation of ethylene bridges between nitrogen atoms and, consequently, an increase in the molecular weight. The viscous solution is allowed to cool, 525 grams of sulfuric acid (50 percent), 250 grams of aqueous formaline solution (30 percent), 375 grams of paraformaldehyde and 125 grams of diphenyl ether are added and the solution is heated to about 100° C. until the para-formaldehyde is completely dissolved. The solution is then cooled to 60-70° C., well stirred with 600 grams of sulfuric acid (70%) and cast upon enamelled plates on which the solution solidifies soon to a gel which is heated first to 90° C. and thereafter to 110° C. for 24 hours. About 2470 grams of xerogel are obtained, which is ground, sifted and introduced into saturated sodium chloride solution for swelling. The exchanger thus obtained is distinguished over the anion exchangers prepared from aliphatic amines only, by good mechanical strength. In similar manner, anion exchangers of equal quality can be obtained from higher or lower boiling polyethylenepolyamine bases.

*Example 9*

313 grams of phenoxyethylchloride are condensed with 120 grams of hexamethylene diamine by heating the mixture to 115° C. The resultant hydrogen chloride is neutralized by means of 2 mols of sodium hydroxide which is added in drops in the form of a concentrated aqueous solution within 1 hour. After stirring for another two hours at 112-115° C. the oily condensation product is separated from the precipitated sodium chloride and the saturated sodium chloride solution, and then polycondensed with formaldehyde to yield an exchanger as described below.

360 grams of the resultant base are converted into the sulfate with 280 grams of sulfuric acid (50 percent). The sulfate is mixed with 150 grams of para-formaldehyde and refluxed for 30-45 minutes whereupon the para-formaldehyde is completely dissolved. 160 grams of sulfuric acid (70 percent) are added to the resultant solution and the temperature is kept at about 80° C. The clear solution solidifies soon to a gel which yields 620 grams of exchanging material after drying at 100° C. for 24 hours.

*Example 10*

A solution of 315 grams of phenoxyethylchloride in 230 grams of piperidine is heated to about 100° C. The temperature rises gradually to 140° C. without further external heating and thereafter drops. 2 mols of sodium hydroxide in the form of a concentrated solution are added in drops while heating to 105° C. within 60 minutes and the mixture is stirred at 105° C. for one hour. The oily condensation product is separated from the resultant sodium chloride and its aqueous solution, and then distilled in vacuum. After removing a forerun, 350 grams of phenoxyethyl piperidine are obtained at 150° C. under a pressure of 12 mm. Hg. 205 grams of phenoxyethyl piperidine are refluxed with 200 grams of sulfuric acid (50 percent) and 90 grams of para-formaldehyde. The para-formaldehyde dissolves. 40 grams of anisol and 160 grams of sulfuric acid are added and the solution is further kept at the boil until a viscous solution is obtained. On prolonged heating to 90° C. the viscous solution solidifies to a clear gel which is dried at 100° C. for 24 hours.

*Example 11*

By reacting phenoxyethyl chloride with symmetrical dimethyl-ethylene diamine both mono- and di-phenoxyethyl-dimethylethylenediamine can be prepared, depending upon the quantitative proportions applied. Mixtures containing both condensation products can be separated either by distillation or by fractional crystallization of their salts, or can be polycondensed as such to yield exchangers. In the reaction of diphenoxyethyldimethylethylenediamine, the additional use of a cross linking agent may be omitted; the polycondensation of monophenoxyethyldimethylethylenediamine, however, is preferably carried out with the complementary use of a compound which is polyfunctional as compared with paraformaldehyde, for instance naphthalene or an aromatic ether. Furthermore, a cross-linking reaction between the secondary nitrogen atoms can be induced by condensing the base with ethylene chloride.

280 grams of sulfuric acid (50 percent) and 100 grams of para-formaldehyde are added to 240 grams of symmetrical diphenoxyethyldimethylethylene diamine. The suspension is refluxed until the aldehyde is completely dissolved. The clear solution is then cooled to 70° C. and mixed with 160 grams of sulfuric acid (70 percent). The solution solidifies soon to a gel which is heated to 110° C. for 24 hours. The exchanger is ground and swelled in saturated sodium chloride solution. After displacing the salt solution by water the exchanger is regenerated with dilute sodium hydroxide. 100 ml. of the exchanger thus treated absorb 145 millival of hydrochloric acid.

I claim:

1. A process for producing an infusible resin having anion exchanging properties and in which the sole functional anion exchange groups are those of the group consisting of basic amino and ammonium groups, which comprises interacting (A) a halo-substituted phenolic ether, in which the phenolic hydroxyl groups are substantially completely etherified and which is capable of reacting with formaldehyde to yield high molecular products, of the group consisting of a ring-halomethylated aryl ether, a haloalkyl aryl ether in which the haloalkyl group is attached to the ether oxygen and a halohydroxypropyl aryl ether in which the halohydroxypropyl group is attached to the ether oxygen, (B) a basic nitrogen compound of the group consisting of ammonia and amines, and (C) formaldehyde, for reaction with said etherified phenolic ether to yield high molecular products, said reaction to yield high molecular products being carried out in an acid medium until a gel is formed, and drying the gel to produce an infusible anion exchange resin.

2. A process of claim 1 wherein the basic nitrogen compounds of the group consisting of ammonia and amines are reacted with the halo-substituted phenolic ethers subsequent to the reaction of said phenolic ethers with formaldehyde.

3. A process of claim 2 wherein the halo-substituted phenolic ether is a ring halomethylated aryl ether.

4. A process of claim 1 wherein the halo-substituted phenolic ether is reacted with a basic amine.

5. A process of claim 1 wherein the basic amino compound is a tertiary amine.

6. A process of claim 5 wherein the tertiary amine is trimethylamine.

7. A product obtained by the process of claim 1.

8. A process for producing an infusible resin having anion exchanging properties and in which the sole functional anion exchange groups are those of the group consisting of basic amino and ammonium groups, which comprises substantially simultaneously interacting a phenol; a basic nitrogen compound of the group consisting of ammonia and amines; and epichlorohydrin to produce a phenolic ether in which the phenolic hydroxyl groups are substantially completely etherified, then reacting said substantially completely etherified phenolic ether with formaldehyde to yield high molecular products, said reaction to yield said high molecular products being carried out in an acid medium until a gel is formed, and drying the gel to produce an infusible anion exchange resin.

References Cited in the file of this patent

UNITED STATES PATENTS

| | | |
|---|---|---|
| 2,259,503 | Wassenegger | Oct. 21, 1941 |
| 2,499,215 | Benneville | Feb. 28, 1950 |
| 2,597,494 | Hwa | May 20, 1952 |
| 2,658,042 | Johnson | Nov. 3, 1953 |

FOREIGN PATENTS

| | | |
|---|---|---|
| 503,546 | Belgium | June 15, 1951 |
| 503,552 | Belgium | June 15, 1952 |
| 829,498 | Germany | Jan. 28, 1952 |

OTHER REFERENCES

Adams et al.: Organic Reactions, I, Wiley, 1942, page 86. (Copy in Science Library.)

Narracott: British Plastics, vol. 24, October 1951, 341–342. Copy in Scientific Library.